(12) United States Patent
Yasuda et al.

(10) Patent No.: US 6,273,236 B1
(45) Date of Patent: Aug. 14, 2001

(54) PALLET EXCHANGE APPARATUS FOR MACHINE TOOL

(75) Inventors: Yukihiko Yasuda; Tsuneto Sumida; Yoji Tanabe; Toshifumi Higuchi, all of Okayama (JP)

(73) Assignee: Yasda Precision Tools K. K., Asakuchi-gun, Okayama (JP)

( * ) Notice: Subject to any disclaimer, the term of this patent is extended or adjusted under 35 U.S.C. 154(b) by 0 days.

(21) Appl. No.: 09/503,354

(22) Filed: Feb. 14, 2000

(30) Foreign Application Priority Data

Feb. 22, 1999 (JP) .................................................. 11-086636

(51) Int. Cl.[7] .................................................. B65G 47/00
(52) U.S. Cl. ...................................... 198/346.1; 198/346.2
(58) Field of Search .............................. 198/346.1, 346.2

(56) References Cited

U.S. PATENT DOCUMENTS

| 4,326,624 | * | 4/1982 | Ewertowski et al. ................. 198/370 |
| 4,934,031 | * | 6/1990 | Maeda et al. .......................... 29/33 P |
| 5,261,147 | * | 11/1993 | Wood, III ............................... 29/33 P |
| 5,454,149 | * | 10/1995 | Buggle et al. ......................... 29/33 P |
| 5,813,514 | * | 9/1998 | Keith ................................. 198/346.2 |
| 5,992,608 | * | 12/1999 | Ahn .................................. 198/346.1 |
| 5,997,241 | * | 12/1999 | Malcolm ............................... 414/806 |
| 6,148,988 | * | 11/2000 | Lin et al. ........................... 198/346.1 |
| 6,183,188 | * | 2/2001 | Randazzo et al. ................. 414/744.5 |
| 6,193,048 | * | 2/2001 | Keith ................................. 198/346.1 |

* cited by examiner

Primary Examiner—Donald P. Walsh
Assistant Examiner—Rashmi Sharma
(74) Attorney, Agent, or Firm—Armstrong, Westerman, Hattori, McLeland & Naughton, LLP

(57) ABSTRACT

A pallet exchange apparatus for a machine tool includes a horizontal rotary support for rotation about a vertical axis. A drive unit vertically moves and rotates the rotary support. The rotary support is flanked by a setup stand which is pivotable between a lying position for receiving a pallet and an upright position for transferring the received pallet onto the rotary support. Further, the rotary support has a plurality of pallet receivers each provided on the rotary support for receiving the pallet in an erect posture from the setup stand which has been pivoted to the upright position.

19 Claims, 6 Drawing Sheets

PALLET EXCHANGE APPARATUS FOR MACHINE TOOL

BACKGROUND OF THE INVENTION

1. Field of the Invention

This invention generally relates to a pallet exchange apparatus for a machine tool. More particularly, it relates to a pallet exchange apparatus for automatically exchanging a pallet in an upright posture relative to a machine tool table.

2. Description of the Related Art

A machine tool often requires a pallet on which a work is set securely for machining with a machine tool. Where the machine tool uses such a pallet, the pallet carrying a work is fixed on the table of the machine tool before machining and then removed from the table after machining in order to replace it with another pallet with a new work.

In view of productivity and labor-saving in machining a large number of works, a pallet-utilizing machine tool is associated with a pallet exchange apparatus which provides an automatic pallet exchange function.

Typically, a conventional pallet exchange apparatus comprises a rotary arm which is rotatable in a vertical plane about a horizontal spindle, two pallet receivers each provided at a respective end of the rotary arm for removably receiving a pallet in the vertical plane of the rotary arm, and a setup stand for holding the pallet in an upright posture and transferring it onto a selected one of the pallet receivers. The pallet carries a work (normally made of a metal) which projects laterally from the vertical plane of the rotary arm when received by the relevant pallet receiver.

In operation of the conventional pallet exchange apparatus, the rotary arm first turns to a position where one of the pallet receivers (referred to as "first pallet receiver" just for convenience of description) is close to the machine tool table while the other pallet receiver (referred to as "second pallet receiver") is close to the setup stand. In this position, the first pallet receiver receives an old pallet (because it carries a finished work) from the machine tool table, whereas the second pallet receiver receives a new pallet (because it carries a work which requires machining) from the setup stand. Then, the rotary arm turns by 180 degrees to bring the first pallet receiver close to the setup stand for replacement with another pallet at the setup stand while bringing the second pallet receiver close to the machine tool table for fixing the new pallet thereto.

In this way, the conventional pallet exchange apparatus provides an automatic pallet exchanging function for enhancing the productivity. However, the conventional pallet exchange apparatus still has the following disadvantages.

As described above, the work held by each pallet receiver projects laterally from the vertical plane of the rotary arm. Thus, the weight of the work acts to twist the rotary arm, which may cause a positional deviation of the pallet relative to the setup stand and/or the machine tool table to make automatic mounting of the pallet difficult. This problem is particularly remarkable when the weight of the work is large.

SUMMARY OF THE INVENTION

It is, therefore, an object of the present invention to provide a pallet exchange apparatus which is capable of eliminating or reducing the above-described problems of the prior art pallet exchange apparatus.

According to a first aspect of the present invention, a pallet exchange apparatus for a machine tool comprises: a rotary support having a substantially horizontal support surface and rotatable about a substantially vertical axis; drive means for vertically moving and rotating the rotary support; a setup stand pivotable between a lying position for receiving a pallet and an upright position for transferring the received pallet onto the rotary support, the pallet carrying a work; and a plurality of pallet receivers each provided on the support surface of the rotary support for receiving the pallet in an erect posture from the setup stand which has been pivoted to the upright position.

Preferably, the pallet has a work carrying surface, and each of the pallet receivers receives the pallet with the work carrying surface directed toward the vertical axis.

Preferably, the pallet may have a follower roller, and each of the pallet receivers may have a guide mechanism for vertically guiding the follower roller of the pallet. More specifically, each of the pallet receivers may comprise a laterally spaced pair of brackets and a lateral support bar projecting upwardly from one of the paired brackets, and the lateral support bar may be provided with a guide groove serving as the guide mechanism.

Further, each of the brackets may also have an inwardly projecting pin for vertically fitting in a corner groove of the pallet.

Typically, the machine tool includes a table movable toward and away from the rotary support. In this case, each of the setup stand and the table may have an identical engaging mechanism for connection to the pallet. More specifically, the pallet may be provided with a plurality of guide recesses, the engaging mechanism may comprise a corresponding number of positioning rollers for removably fitting in the guide recesses of the pallet. Additionally or alternatively, the pallet may have a ring groove formed with a first coupling, whereas the engaging mechanism may comprise a second coupling for removable engagement with the first coupling.

In a preferred embodiment, the pallet has an outer ring groove formed with a first coupling, whereas the engaging mechanism comprises a second coupling for removable engagement with the first coupling. Further, the pallet is also provided with a plurality of inner guide recesses surrounded by the outer ring groove, whereas the engaging mechanism also comprises a corresponding number of positioning rollers for removably fitting in the inner guide recesses of the pallet.

Preferably, the drive means may comprise a vertical spindle fixed centrally to the rotary support for movement therewith. Further, the rotary support may be in the form of a rotary arm, in which case each of the pallet receivers may be provided at a respective end of the rotary arm.

According to a second aspect of the present invention, a pallet exchange apparatus for a machine tool comprises: a rotary support having a substantially horizontal support surface and rotatable about a substantially vertical axis; drive means for rotating the rotary support; and a plurality of pallet receivers each provided on the support surface of the rotary support for receiving a pallet in an erect posture, the pallet having a work carrying surface directed toward the vertical axis when received by each pallet receiver.

Other objects, features and advantages of the present invention will become apparent from the following description of the preferred embodiment given with reference to the accompanying drawings.

DETAILED DESCRIPTION OF THE PREFERRED EMBODIMENTS

The preferred embodiment of the present invention will be specifically described with reference to the accompanying drawings.

Figure 1:
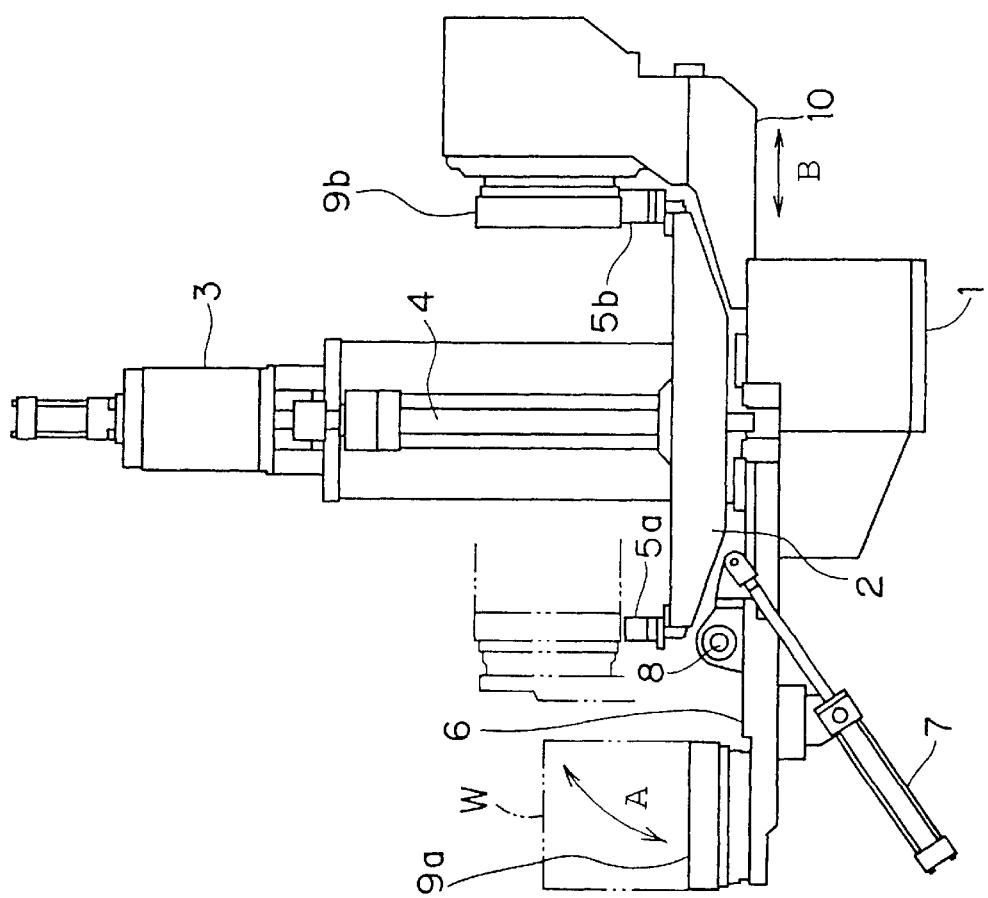
FIG. 1 is a side view of a pallet exchange apparatus according to the present invention.
Figure 2:
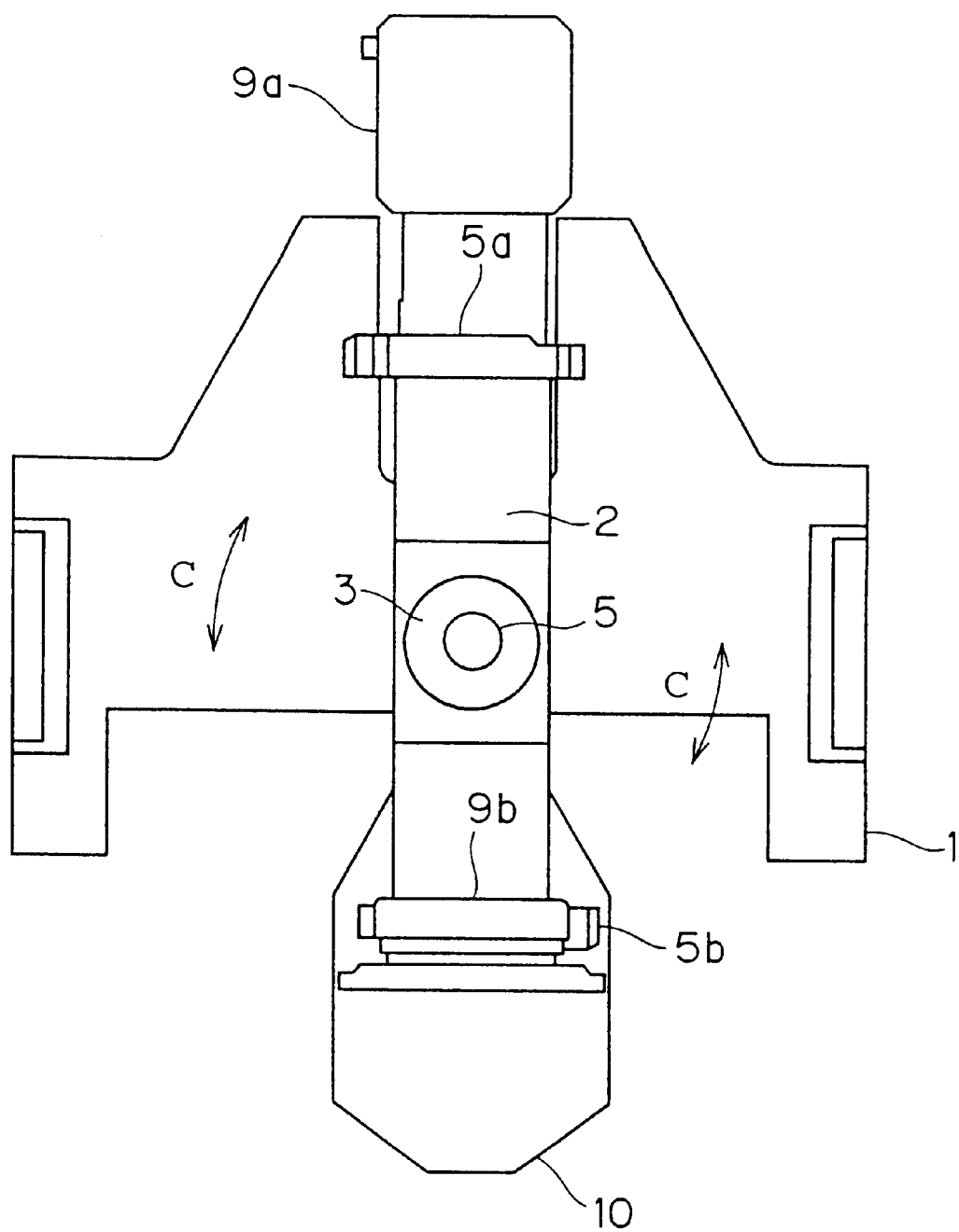
FIG. 2 is a top plan view of the same pallet exchange apparatus.

Referring to FIGS. 1 and 2, a pallet exchange apparatus embodying the present invention comprises a base support 1, a rotary arm 2 (an example of rotary support) horizontally provided on the base support 1, and a vertical and rotational drive unit 3 with a spindle 4. The spindle 4 extends vertically for connection to the center of the rotary arm 2 such that the rotary arm 2 turns horizontally around the spindle 4 while moving up and down with the spindle 4, as indicated by a double-headed arrow.

The rotary arm 2 has, at its respective ends, a first pallet receiver 5a (left-hand side in FIG. 1) and a second pallet receiver 5b (right-hand side in FIG. 1) for receiving and holding pallets 9a, 9b, respectively. The first and second pallet receivers 5a, 5b are made of a rigid metal.

The base support 1 is further provided with a setup stand 6 and a drive cylinder 7. The setup stand 6 is pivotable around a pivot 8, as indicated by a double-headed arrow A. The drive cylinder 7 raises up the setup stand 6 above the rotary arm 2 and then returns it down. The pallet 9a, as a new pallet to be set up, is removably attached to the outer end (left-hand end in FIG. 1) of the setup stand 6 in a horizontal posture together with a work W (shown in phantom lines in FIG. 1). The setup stand 6 is provided with a mechanism (not shown) for manually rotating the work W on the setup stand 6.

On the other hand, the pallet 9b is supported erect on the second pallet receiver 5b for removably clamping to a table 10 of a machine tool (only partially shown in FIGS. 1 and 2). The table 10 is provided diametrically opposite to the setup stand 6. The table 10 is movable toward and away from the rotary arm 2 by means of a drive mechanism (not shown) of the machine tool, as indicated by a double-headed arrow B.

Each of the pallets 9a, 9b is generally rectangular and has an identical structure for fastening to the work W, and for selectively fastening onto the setup stand 6 and the machine tool table 10. One side (inner side) of the pallet is a work carrying surface (not shown) of a known structure for carrying the work W to be machined. The other side (outer side) of the pallet is a mount surface which is used for selectively fixing to the setup stand 6 and the machine tool table 10, as more specifically described blow.

Figure 3:
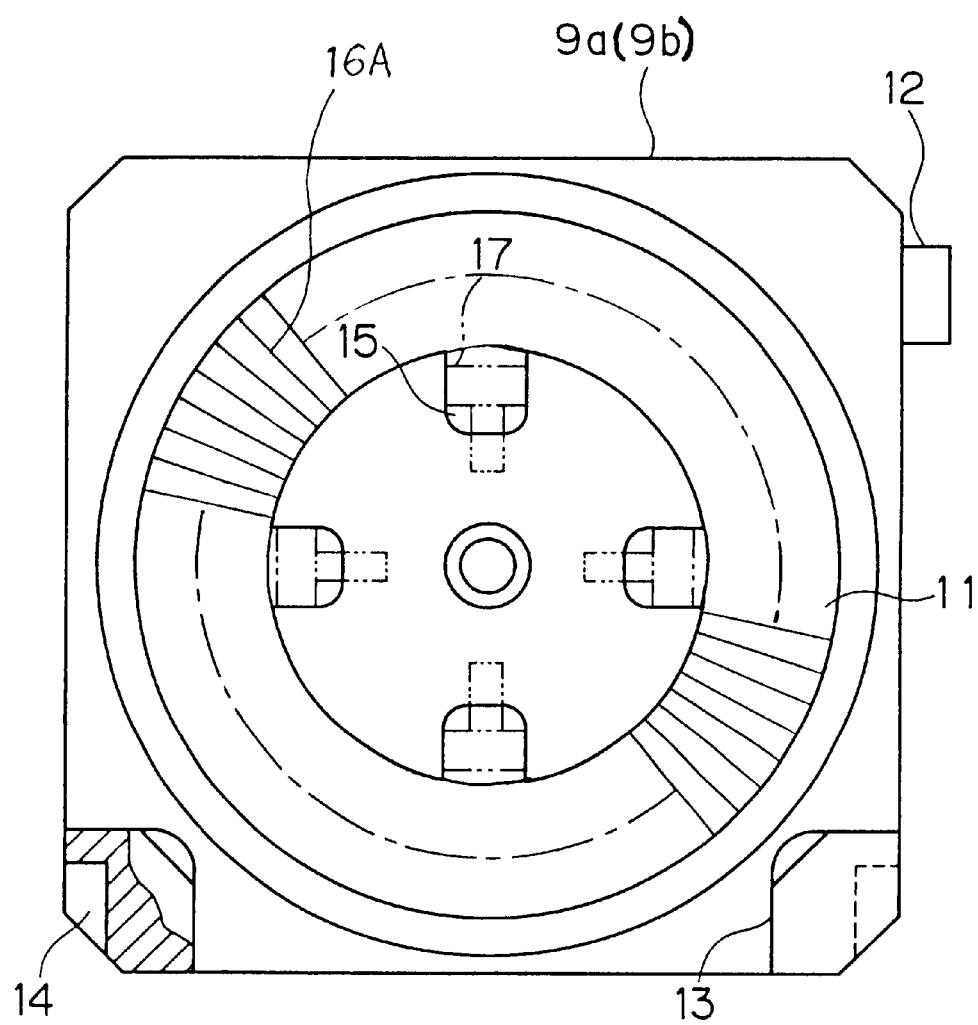
FIG. 3 is a plan view showing a pallet which is exchanged by the same pallet exchange apparatus.
Figure 4:
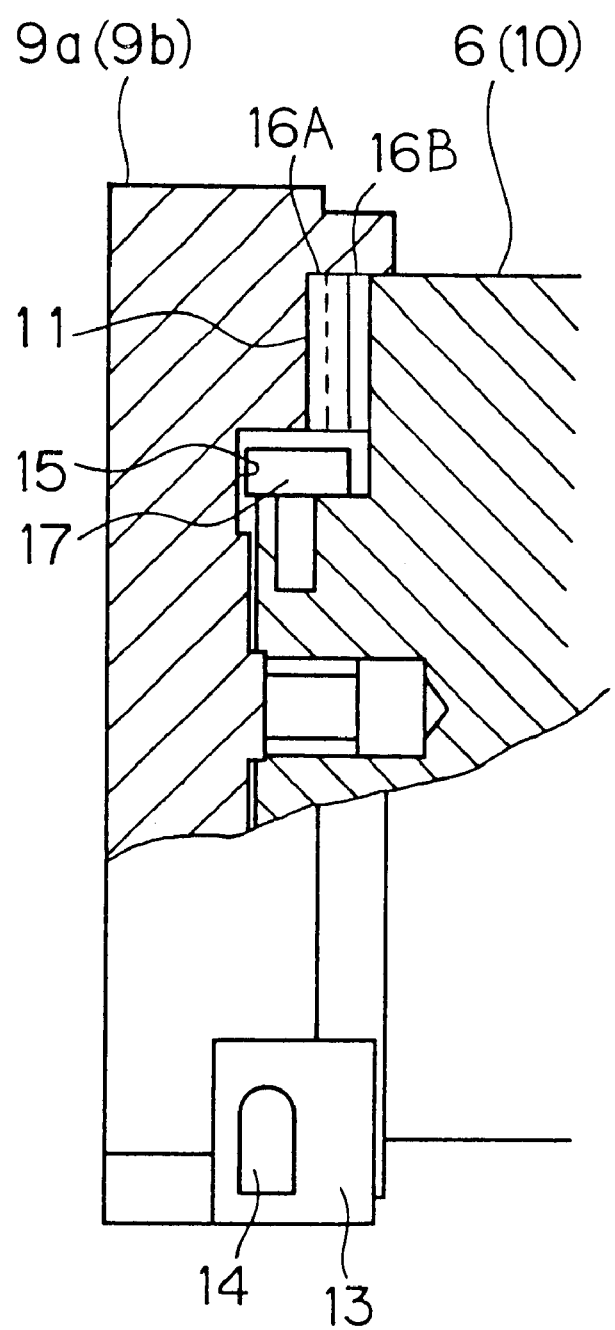
FIG. 4 is a side view, partly in section, showing how the pallet is mounted to a setup stand or a machine tool table.

As shown in FIGS. 3 and 4, the mount surface of each pallet 9a, 9b is formed with an outer ring groove 11 and four inner guide recesses 15 surrounded by the outer ring groove 11. The outer ring groove 11 has a first coupling 16A which includes an annular series of radially extending teeth. Each of the setup stand 6 and the machine tool table 10 correspondingly has a second coupling 16B which also includes an annular series of radially extending teeth for removable engagement with the teeth of the first coupling 16A, thereby preventing the pallet from rotationally devitating relative to the setup stand 6 or the machine tool table 10.

The four inner guide recesses 15 are equiangularly spaced. Each of the setup stand 6 and the table 10 has a corresponding set of positioning rollers 17 for removably fitting in the guide recesses 15. The combination of the guide recesses 15 and the positioning rollers 17 serves to guide the pallet into proper engagement with the setup stand 6 and the table 10. The number of the guide recesses 15 and of the positioning rollers 17 is not limited to four (as in the illustrated embodiment) but may be optionally selected.

Each pallet 9a, 9b is clamped to and unclamped from the setup stand 6 or the machine tool table 10 by a known clamping mechanism (not shown) utilizing e.g. springs, pins, screws and bolts.

Figure 5:
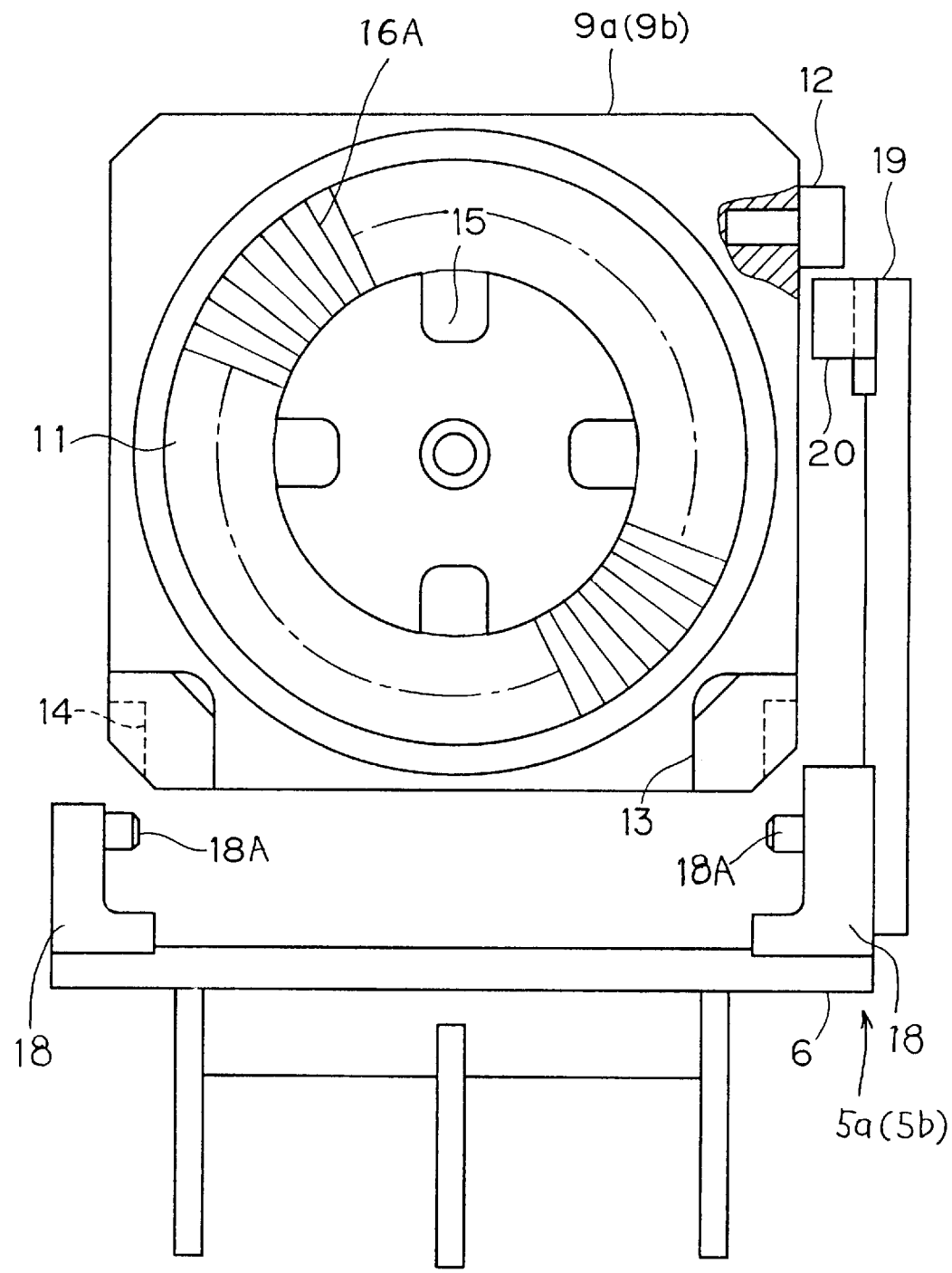
FIG. 5 is a plan view showing a pallet receiver of the same pallet exchange apparatus in its condition for receiving the pallet.

As shown in FIGS. 3 and 5, each pallet 9a, 9b is provided with a follower roller 12 projecting from a side edge of the pallet. Further, the pallet is also provided, at both lower corners, with a pair of support blocks 13. Each of the support blocks 13 is formed with a corner groove 14 having a round upper end (see FIG. 4).

Figure 6:
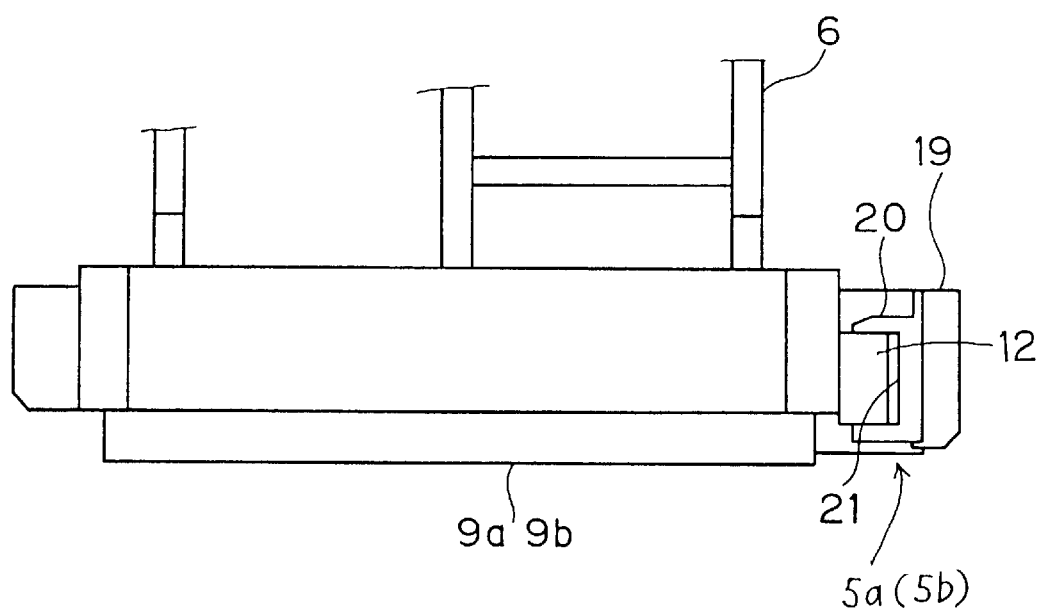
FIG. 6 is a top plan view showing the pallet as received by the pallet receiver.

Referring to FIGS. 5 and 6, the pallets 9a, 9b are removably supported by the first and second pallet receivers 5a, 5b, respectively, mounted on the rotary arm 2. Each of the pallet receivers 5a, 5b includes a laterally spaced pair of brackets 18 and a lateral support bar 19 extending upward from one of the paired brackets 18. Each bracket 18 has a pin 18A projecting inwardly for fitting in a corresponding corner groove 14 of the pallet from below. The lateral support bar 19 is provided, at its top end, with an inwardly directed guide member 20 which, in turn, is formed with a guide groove 21 for guiding the follower roller 12 of the pallet.

The above-described pallet exchange apparatus performs a pallet exchanging function in the following manner.

Initially, the rotary arm 2 assumes a rest position which is 90 degrees away from the solid line position shown in FIG. 2. In this initial position, each of the pallet receivers 5a, 5b holds no pallet. Further, the setup stand 6 assumes a lying position, whereas the table 10 is in its retreated position while holding a pallet 9b together with a work W which has been already processed by the machine tool (not shown).

Then, the operator places a new pallet 9a with a new work W onto the lying setup stand 6 and causes the associated clamp mechanism (not shown) to clamp the new pallet 9a on the setup stand 6.

Then, the drive cylinder 7 causes the setup stand 6 to pivot around the pivot 8 to its upright position, whereas the table 10 moves forward.

Then, in response to a pallet exchange instruction from the machine tool, the vertical and rotational drive unit 3 causes the rotary arm 2 to turn by 90 degrees such that the pallet receivers 5a, 5b are brought just below the pallets 9a, 9b, respectively, as shown in FIGS. 1 and 2.

Then, the vertical and rotational drive unit 3 causes the rotary arm 2 to move up with the spindle 4, whereby the pallet receivers 5a, 5b support the pallets 9a, 9b, respectively, as the pins 18A of the pallet receivers 9a, 9b are received in the corner grooves 14. At the same time, the follower rollers 12 of the pallets 9a, 9b are received in the respective guide grooves 21 of the pallet receivers 5a, 5b.

Then, the setup stand 6 unclamps the pallet 9a while the table 10 unclamps the pallet 9b. As a result, the rotary arm 2 supports the whole mass of the pallets 9a, 9b and the works W via the pallet receivers 5a, 5b.

Then, the drive cylinder 7 causes the setup stand 6 to pivot around the pivot 8 to the initial lying position, whereas the table 10 retreats (rightward in FIG. 1) away from the rotary arm.

Then, the vertical and rotational drive unit 3 causes the rotary arm 2 to turn by 180 degrees together with the supported pallets 9a, 9b.

Then, the setup stand 6 is pivoted again to its upright position, and the table 10 moves forward.

Then, the setup stand 6 clamps the pallet 9b, whereas the table 10 clamps the pallet 9a, as shown in FIGS. 3 and 4. In this condition, the first coupling 16A of each pallet 9a, 9b is held in engagement with the second coupling 16B of the setup stand 6 or the table 10 with the positioning rollers 17 received in the deeper portions 15A of the central recess 15 of the pallet.

Then, the rotary arm 2 is lowered to disengage the guide groove 21 from the follower roller 12 of each pallet 9a, 9b while also disengaging the pins 18A from the corner grooves 14 of the pallet.

Finally, the rotary arm 2 with the emptied pallet receivers 5a, 5b turns by 90 degrees to the initial rest position. Further, the setup stand 6 with the pallet 9b holding the machined work W is pivoted down to its initial lying position for replacement with a new pallet, whereas the table 10 with the new pallet 9a retreats to the machining position where the new work W held by the pallet 9a is subjected to machining.

The pallet exchange apparatus thus described has the following advantages.

In the illustrated embodiment, both of the pallets 9a, 9b are supported by the pallet receiver 5a, 5b in an upright or erect posture on the rotary arm 2 which has an upwardly supporting face and rotates in a horizontal plane. Thus, in a stationary state, the weights of the pallets 9a, 9b and the works W exert only a bending moment on the rotary arm 2 rather than a twisting moment. Accordingly, since it is easier and more reliable to reinforce the rotary arm 2 against bending than reinforcing it against twisting, the pallets 9a, 9b or the works W held thereby do not deviate from their appropriate positions when clamping to the setup stand 6 or the table 10, thereby enabling a high-speed pallet exchange and high productivity.

Further, since the work carrying surface of each pallet 9a, 9b is oriented inwardly, the work W (heaviest object) held by the pallet is located as close to the spindle 4 as possible. Such an arrangement minimizes the bending moment loaded on the rotary arm 2 while also reducing the moment of inertia resulting from the mass of the work W when the rotary arm 2 turns around the spindle 4. This also contributes to realization of high-speed pallet exchange, operational stability and size reduction.

Moreover, when the rotary arm 2 transfers each pallet 9a, 9b to the setup stand 6 or the machine tool table 10, the guide rollers 17 of the setup stand 6 or the machine tool table 10 can smoothly guide the pallet into proper coupling engagement even if there is a slight positional deviation of the pallet.

The present invention being thus described, it is apparent that the same may be varied in many ways. Such variations should not be regarded as a departure from the spirit and scope of the present invention, and all such modifications as would be obvious to those skilled in the art are intended to be included within the scope of the following claims.

What is claimed is:

1. A pallet exchange apparatus for a machine tool comprising:
    a rotary support having a substantially horizontal support surface and rotatable about a substantially vertical axis;
    drive means for vertically moving and rotating the rotary support;
    a setup stand pivotable between a lying position for receiving a pallet and an upright position for transferring the received pallet onto the rotary support, the pallet carrying a work; and
    a plurality of pallet receivers each provided on the support surface of the rotary support for receiving the pallet in an erect posture from the setup stand which has been pivoted to the upright position.

2. The pallet exchange apparatus according to claim 1, wherein the pallet has a work carrying surface, each of the pallet receivers receiving the pallet with the work carrying surface directed toward the vertical axis.

3. The pallet exchange apparatus according to claim 1, wherein the pallet has a follower roller, each of the pallet receivers having a guide mechanism for vertically guiding the follower roller of the pallet.

4. The pallet exchange apparatus according to claim 3, wherein each of the pallet receivers comprises a laterally spaced pair of brackets and a lateral support bar projecting upwardly from one of the paired brackets, the lateral support bar being provided with a guide groove serving as the guide mechanism.

5. The pallet exchange apparatus according to claim 4, wherein each of the brackets has an inwardly projecting pin for vertically fitting in a corner groove of the pallet.

6. The pallet exchange apparatus according to claim 4, wherein the machine tool includes a table movable toward and away from the rotary support, each of the setup stand and the table having an identical engaging mechanism for connection to the pallet.

7. The pallet exchange apparatus according to claim 6, wherein the pallet is provided with a plurality of guide recesses, the engaging mechanism comprising a corresponding number of positioning rollers for removably fitting in the guide recesses of the pallet.

8. The pallet exchange apparatus according to claim 6, wherein the pallet has a ring groove formed with a first coupling, the engaging mechanism comprising a second coupling for removable engagement with the first coupling.

9. The pallet exchange apparatus according to claim 6, wherein the pallet has an outer ring groove formed with a first coupling, the engaging mechanism comprising a second coupling for removable engagement with the first coupling, the pallet being further provided with a plurality of inner guide recesses surrounded by the outer ring groove, the engaging mechanism further comprising a corresponding number of positioning rollers for removably fitting in the inner guide recesses of the pallet.

10. The pallet exchange apparatus according to claim 1, wherein the drive means comprises a vertical spindle fixed centrally to the rotary support for movement therewith.

11. The pallet exchange apparatus according to claim 1, wherein the rotary support comprises a rotary arm, each of the pallet receivers being provided at a respective end of the rotary arm.

12. A pallet exchange apparatus for a machine tool comprising:
    a rotary support having a substantially horizontal support surface and rotatable about a substantially vertical axis;

drive means for rotating the rotary support; and a plurality of pallet receivers each provided on the support surface of the rotary support for receiving a pallet in an erect posture, the pallet having a work carrying surface directed toward the vertical axis when received by each pallet receiver.

13. The pallet exchange apparatus according to claim 12, wherein the pallet has a follower roller, each of the pallet receivers having a guide mechanism for vertically guiding the follower roller of the pallet.

14. The pallet exchange apparatus according to claim 13, wherein each of the pallet receivers comprises a laterally spaced pair of brackets and a lateral support bar projecting upwardly from one of the paired brackets, the lateral support bar being provided with a guide groove serving as the guide mechanism.

15. The pallet exchange apparatus according to claim 14, wherein each of the brackets has an inwardly projecting pin for vertically fitting in a corner groove of the pallet.

16. The pallet exchange apparatus according to claim 12, further comprising a setup stand pivotable between a lying position for receiving a pallet and an upright position for transferring the received pallet to each of the pallet receivers.

17. The pallet exchange apparatus according to claim 16, wherein the machine tool includes a table movable toward and away from the rotary support, each of the setup stand and the table having an identical engaging mechanism for connection to the pallet.

18. The pallet exchange apparatus according to claim 17, wherein the pallet is provided with a plurality of guide recesses, the engaging mechanism comprising a corresponding number of positioning rollers for removably fitting in the guide recesses of the pallet.

19. The pallet exchange apparatus according to claim 18, wherein the pallet has an outer ring groove formed with a first coupling, the engaging mechanism comprising a second coupling for removable engagement with the first coupling, the pallet being further provided with a plurality of inner guide recesses surrounded by the outer ring groove, the engaging mechanism further comprising a corresponding number of positioning rollers for removably fitting in the inner guide recesses of the pallet.

* * * * *